United States Patent
Börner

(10) Patent No.: US 9,126,220 B2
(45) Date of Patent: Sep. 8, 2015

(54) PAINT MATERIAL SWITCHING PATH AND COLOUR CHANGER

(75) Inventor: Gunter Börner, Sinsheim (DE)

(73) Assignee: ABB TECHNOLOGY AG, Zurich (CH)

( * ) Notice: Subject to any disclaimer, the term of this patent is extended or adjusted under 35 U.S.C. 154(b) by 550 days.

(21) Appl. No.: 13/565,012

(22) Filed: Aug. 2, 2012

(65) Prior Publication Data

US 2013/0032213 A1    Feb. 7, 2013

(30) Foreign Application Priority Data

Aug. 3, 2011   (EP) ..................... 11006382

(51) Int. Cl.
*B05B 12/08* (2006.01)
*B05B 12/14* (2006.01)
*G01M 3/28* (2006.01)

(52) U.S. Cl.
CPC ............ *B05B 12/085* (2013.01); *B05B 12/14* (2013.01); *G01M 3/2876* (2013.01); *Y10T 137/0318* (2015.04); *Y10T 137/8158* (2015.04)

(58) Field of Classification Search
CPC ............ E03B 7/07; E03B 7/071; G01M 3/04; G01M 3/16; G01M 3/2876; F17D 5/06; B05B 12/085; B05B 12/14
USPC ....................... 137/15.11, 312, 240
See application file for complete search history.

(56) References Cited

U.S. PATENT DOCUMENTS

| | | | | |
|---|---|---|---|---|
| 5,975,114 A | * | 11/1999 | Stahl et al. | 137/312 |
| 6,725,130 B1 | * | 4/2004 | Rogers et al. | 700/282 |
| 7,107,820 B2 | * | 9/2006 | Nunnally et al. | 73/40 |
| 8,333,210 B1 | * | 12/2012 | Henkel et al. | 137/15.11 |
| 2008/0266125 A1 | * | 10/2008 | Windisch et al. | 340/605 |

* cited by examiner

*Primary Examiner* — Kevin Lee
(74) *Attorney, Agent, or Firm* — Buchanan Ingersoll & Rooney PC

(57) ABSTRACT

An exemplary paint material switching path includes first and second valve elements, each having an inlet and an outlet, and a hollow cylindrical intermediate piece arranged between the outlet of the first valve element and the inlet of the second valve element. The inlet of the first valve element is configured to be connected to a continuously pressurized paint material supply, and a manifold channel which is configured to be pressurized and into which the outlet of the second valve element opens. Furthermore, components are provided for measuring the pressure prevailing in the hollow cylindrical intermediate piece and an evaluation device for detecting leaks in at least one of the two valve elements based on the measured pressure with respect to time for a given pressure difference between the inlet of the first valve element and the outlet of the second valve element at the beginning of the leak detection.

11 Claims, 2 Drawing Sheets

PAINT MATERIAL SWITCHING PATH AND COLOUR CHANGER

RELATED APPLICATION(S)

This application claims priority under 35 U.S.C. §119 to European Application EP 11006382.3 filed in Europe on Aug. 3, 2011. The content of which is hereby incorporated by reference in its entirety.

FIELD

The disclosure relates to a paint material switching path and a colour changer having paint material switching paths of this kind and an appropriate method for leak detection.

BACKGROUND INFORMATION

Paint materials with a multiplicity of different colour shades can be used in industrial painting systems, for example in the automobile industry, for the coating of workpieces such as automobile bodies. Depending upon the market segment of the manufacturer, this can be ten different colour shades, for example, or even fifty and more. Workpieces are usually painted by means of painting robots which are arranged in a climatized paint booth. The workpieces can be fed into the paint booth by means of a conveyor device where they are then coated by the painting robots. The order of the workpieces to be coated in a desired colour shade on the conveyor device is usually specified by the overall production process. A frequent colour change can therefore be implemented at the respective painting robots. For a cycle time of 60 s-80 s per workpiece or workpiece carrier, the number of colour changes called for can be several hundred per day and per robot.

With a colour changer according to the prior art, a multiplicity of paint material supply hoses opens out into a common manifold channel via appropriate valves. This is sealed at one end and, at its other end, has a fluidic connection to an atomiser by means of a hose connection. When a colour is changed, the paint material in the common manifold channel, hose connection and atomiser should first be pushed out as waste before this path can then be purged and new paint material subsequently pushed in.

When a colour is changed, in all cases it should be ensured that no paint is carried over. This is an introduction—even if only infinitesimally small—of a first paint material into a second paint material. Depending on the colour shades which are unintentionally mixed with one another, paint carryover can be highly detrimental to the painting result, for example when a small amount of a red colour shade finds its way into a white colour shade which then appears pink in some areas. To prevent paint carryover of this kind, it is essential to thoroughly clean the manifold channel appropriately when changing the colour.

However, paint carryover can occur in spite of appropriate cleaning measures, namely if one of the switching valves leaks, that is to say, in spite of an actually closed switching state, a quantity of paint material, albeit only small, finds its way from the respective supply line into the manifold channel. A known measure for further reducing the risk of paint carryover due to a leaking valve consists in fluidically connecting two valves or valve means in series to form a double arrangement and to switch them synchronously. In this case, leakage of the whole arrangement can be possible in the event of a defect in both of the series-connected valve means.

However, a series connection of valve means in a paint material switching path can increase reliability to a certain extent, as both valves are subject to the same switching cycles, and therefore synchronized wear and failure of both valves is probable.

Paint material switching paths according to known implementations can make detection of leakage of the valve means or allow detection from already incorrectly coated workpieces which are then scrap.

SUMMARY

An exemplary paint material switching path is disclosed, comprising: first and second valve means each valve means having an inlet and an outlet; a hollow cylindrical intermediate piece arranged between the outlet of the first valve means and the inlet of the second valve means, wherein the inlet of the first valve means is configured to be connected to a continuously pressurised paint material supply; a manifold channel which is configured to be pressurised and into which the outlet of the second valve means opens; means for measuring pressure in the hollow cylindrical intermediate piece; and an evaluation device that detects leaks in at least one of the two valve means based on the measured pressure with respect to time for a given pressure difference between the inlet of the first valve means and outlet of the second valve means when leak detection begins.

An exemplary colour changer is disclosed, comprising: a plurality of paint material switching paths, wherein each switching path comprises: first and second valve means each valve means having an inlet and an outlet; a hollow cylindrical intermediate piece arranged between the outlet of the first valve means and the inlet of the second valve means, wherein the inlet of the first valve means is configured to be connected to a continuously pressurised paint material supply; a manifold channel which is configured to be pressurised and into which the outlet of the second valve means opens; means for measuring pressure in the hollow cylindrical intermediate piece; and an evaluation device that detects leaks in at least one of the two valve means based on the measured pressure with respect to time for a given pressure difference between the inlet of the first valve means and outlet of the second valve means when leak detection begins, and wherein, each path opens out into a common manifold channel.

An exemplary method for detecting a leak in a valve means of a paint material switching path is disclose, where the switching path includes first and second valve means each valve means having an inlet and an outlet, a hollow cylindrical intermediate piece arranged between the outlet of the first valve means and the inlet of the second valve means, wherein the inlet of the first valve means is configured to be connected to a continuously pressurised paint material supply; a manifold channel which is configured to be pressurised and into which the outlet of the second valve means opens; means for measuring pressure in the hollow cylindrical intermediate piece; and an evaluation device that detects leaks in at least one of the two valve means based on the measured pressure with respect to time for a given pressure difference between the inlet of the first valve means and outlet of the second valve means when leak detection begins, the method comprising: closing the first valve means to be checked; producing a pressure difference between inlet and outlet of the first closed valve means to be checked when the second valve means is open; closing the second valve means; determining pressure characteristic with respect to time in a sealed hose path; and determining whether the first valve means to be checked is faulty based on the pressure characteristic.

BRIEF DESCRIPTION OF THE DRAWINGS

The disclosure, further embodiments and further advantages are described in more detail with reference to the exemplary embodiments shown in the drawings.

In the drawings.

DETAILED DESCRIPTION

Figure 1:
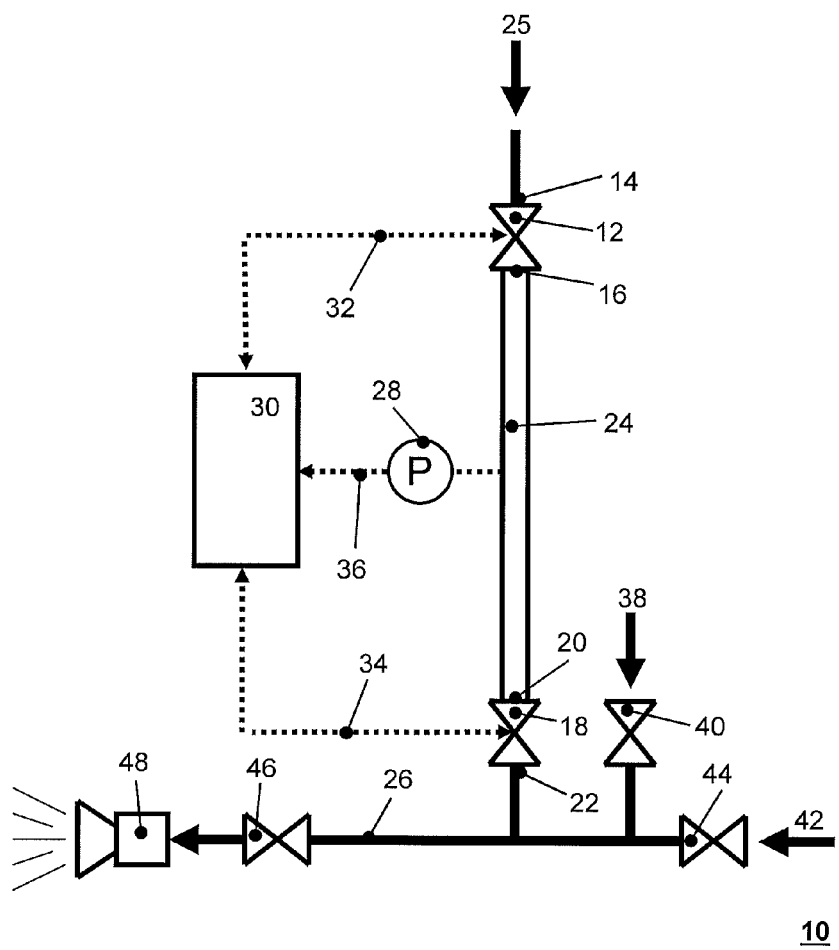
FIG. 1 shows an first paint material switching path with paint supply system in accordance with an exemplary embodiment of the present disclosure.

Exemplary embodiments of the present disclosure provide a paint material switching path and a colour changer with a possibility of early and reliable leakage detection and a corresponding method of use.

The exemplary embodiments described herein include means for measuring the pressure prevailing in the hollow cylindrical intermediate piece and an evaluation device for detecting leaks in at least one of the two valve means based on the characteristic of the measured pressure with respect to time for a given pressure difference between inlet and outlet of the respective valve means at the beginning of the leak detection.

The exemplary embodiments improve a known series connection of valve means in such a way that a leak is detected based on a drift of the measured pressure characteristic in the hollow cylindrical intermediate piece which serves as a connection and which is to be sealed on both sides by the valves during the leak detection. For this purpose, a pressure difference should first be built up between the inlet and the outlet of the valve to be checked. This can be carried out in several ways.

On the one hand, the second valve, which opens out into the manifold channel, can initially be closed so that the full pressure of the paint material supply, for example 8 bar, also prevails in the hollow cylindrical intermediate piece. In this case, the manifold channel should be depressurised so that a pressure difference of approximately 8 bar prevails between inlet and outlet of the second valve. The first valve should then be closed so that the tube-like intermediate piece is hermetically sealed on both sides. In the event of a leak in the second valve, paint material flows out through the defective valve into the manifold channel due to the pressure difference, so that a pressure drop or a pressure drift occurs in the tube-like intermediate piece. Replacement of the outflowing material by the paint material supply is namely prevented by the closed first valve. A leak in the second valve can therefore advantageously be inferred by measuring the pressure characteristic or a pressure drop in the tube-like intermediate piece.

According to an exemplary embodiment disclosed herein a leak can be determined in the first valve by depressurising the tube-like intermediate piece and then sealing it off on both sides by means of the valves. This is achieved by first closing the first valve while the second valve is still open and the manifold channel is likewise depressurised. Any pressure prevailing in the tube-like intermediate space can thus be relieved into the manifold channel. The second valve should then also be closed so that, if the valves are correctly closed, the tube-like intermediate piece remains depressurised. In the event of a leak in the first valve, paint material seeps out of the pressurised supply line into the intermediate piece. This leads to a drifting pressure increase here, as the built-up pressure cannot be dissipated into the manifold channel on account of the second closed valve. Under these frame conditions, a leak in the first valve can therefore be inferred by measuring the pressure characteristic or a pressure increase in the tube-like intermediate piece.

Accordingly, when pressure acts on the intermediate space on both sides from the outside, it is also possible to infer that one of the two valves is defective, albeit without obtaining exact information as to which valve is leaking. For this purpose, the first valve should again be closed first and the second opened with the manifold channel depressurised. The second valve should then be closed. The manifold channel can now likewise be repressurised, for example when a further paint material flows through it from a further paint medium switching path in painting mode. A pressure increase in the tube-like intermediate piece is then a criterion for a defect of at least one of the two adjoining valves.

On the other hand, the condition that no information is available as to which of the two valves is defective, is however offset in that leak detection of the exemplary embodiments in the present disclosure can take place while painting is being carried out, such as during the paint flow of a further paint material via a further paint switching path through the manifold space and from there, for example, to an atomiser. In so doing, the manifold channel can be pressurised. Here, the whole period of the painting cycle, for example 60 s-80 s, is available for detecting a drift in the measured pressure without having to interrupt serial painting.

According to an exemplary embodiment the tube-like intermediate piece can be designed with a certain elasticity, for example in the form of a piece of hose, in order to somewhat equalise a pressure increase with respect to time and therefore make it easier to detect. Naturally, a piece of tube made of metal, for example stainless steel, is however also possible.

A commercially available pressure sensor, for example, is used as a means for detecting the pressure in the tube-like intermediate piece. This generates continuous measuring signals which are then fed to the evaluation device, for example to a calculator device or even to a control computer. The evaluation device can also use information relating to the switching state of the two valves, as a pressure measurement for detecting a leak should be carried out when both valves are closed. This information should be made available to the evaluation device, for example by means of appropriate signal cables. The signal cables can be connected directly to the valves; however, they can also be coupled to a central control system which, for example, controls the paint supply to a whole production line or to at least one paint booth. If a leak is detected, a warning message or fault message can be generated and output, so that the defective valve can be replaced by the maintenance personnel.

To produce the output pressure conditions specified for an exemplary implementation, it is sufficient, for example, when there is a time of 1 s to 2 s between the switching of the two valves which seal the tube-like intermediate piece, so that the pressure can build up or decrease as appropriate in this time period. The time for measuring a pressure drift can be kept as long as possible in order to achieve as high an accuracy as possible by means of a correspondingly high accumulated pressure drift, wherein, for example, 60 s is quite adequate.

According to a further exemplary embodiment of the disclosure, both valve means are designed to be closed during leak detection. The tube-like intermediate piece is therefore hermetically sealed on both sides, so that, when the valves are functioning correctly, a constant pressure prevails therein, which can then be used as a criterion that each valve is working correctly.

According to another exemplary embodiment of the disclosure, the valve means can be switched by the evaluation device. This enables leak detection to be easily carried out or controlled by the evaluation device itself, which then controls the valves in a sequence which can be specified at any time for detecting a leak. In an exemplary embodiment, the evaluation device can be integrated within a control computer, which in any case is provided for the control of the paint supply and also other system components. However, the control computer can also be a robot controller, for example, which as well as the actual movement sequence of the associated robot then also controls its paint supply. The control cables can be available in any case, so that all that should be specified in the way of additional outlay is a pressure sensor, an associated communications cable and program modifications to the control software.

According to a further exemplary embodiment of the disclosure, further valve means are provided, by means of which the manifold channel can optionally be pressurised and which can be switched by the evaluation device. The paint material switching path according to the disclosure can be seen as one of the plurality of supply branches of a colour changer. A common manifold channel, into which a plurality of paint material switching paths opens out, is provided here. Accordingly, in the event of a colour change, an air and/or solvent line, which open out into the manifold channel and can be switched by means of further valves in each case, can be provided. Likewise, the output of the manifold channel, which is fed to an atomiser or to another paint removal point, can usually likewise be sealed by means of a valve, which, if necessary, can also be directly arranged in the atomiser in the form of a main needle valve. As long as no paint material or solvent is flowing thereto, the pressure in the manifold channel can be relieved by opening the valve for the manifold channel output. In an exemplary embodiment, in order to build up a pressure in the manifold channel, one of the paint material switching paths according to the disclosure is opened, wherein a pressure then prevails in the manifold channel both when the output valve is open and when it is closed.

According to another exemplary embodiment of the disclosure, in order to address the problem set, a colour changer comprises a plurality of paint material switching paths opens out into a common manifold channel. Such a colour changer provides high reliability and allows valve defects to be detected before coated workpieces have to be removed as scrap due to paint being carried over on account of defective valve means.

In an exemplary embodiment of the present disclosure, a common evaluation device is provided for detecting leaks in the paint switching paths of the colour changer. This advantageously reduces the control outlay. It has further been shown to be advantageous when an exemplary colour changer according to the disclosure is also completely incorporated into the line control system, enabling it, for example, to be monitored by a common control computer, which is in any case provided for a paint booth, for example. Here too, an advantageous further variant involves controlling and monitoring the colour changer according to the disclosure by means of a robot controller.

Further exemplary embodiments for the integration of a colour changer according to the disclosure into a paint supply system provides that the common manifold channel is designed for being connected, for example by means of suitable connecting devices, to an atomiser for paint material. Likewise, in the event of a colour change, means should be provided for purging the colour changer with a solvent or an air-solvent mixture. The solvent being supplied through supply lines which open out into the common manifold channel via respective valve means.

Exemplary embodiments disclosed herein provide a method for detecting a leak in a valve means of a paint material switching path that includes closing the first valve means to be checked, producing a pressure difference between inlet and outlet of the first closed valve means to be checked when the second valve means is open, closing the second valve means, determining the pressure characteristic with respect to time in the sealed hose path, detection of the first valve means to be checked as faulty in the event of a drifting pressure characteristic.

As already described above, an exemplary procedure provides the creation of given pressure conditions in the tube-like intermediate piece which is then sealed on both sides by the valve means so that when the valve means close correctly a constant internal pressure is maintained—regardless of varying external pressure conditions. An increase in pressure or a loss in pressure is therefore an indicator of a leak in one of the valves.

A leak in the second valve means can be determined by applying the above mentioned method for leak detection to the second valve means in a similar way. Both variations of the method can also be combined with one another, wherein the tube-like intermediate piece should then initially be depressurised and subsequently sealed on both sides. In the event, that a certain pressure then prevails on both sides from the outside, for example a further paint material just then flows through a common manifold channel of an exemplary colour changer according to the disclosure, if a leak is detected it cannot however be unambiguously established which of the two adjoining valve means is defective. In this case, however, it is possible for a leak to be detected while painting is being carried out.

FIG. 1 shows an first paint material switching path with paint supply system in accordance with an exemplary embodiment of the present disclosure. A first valve means 12 is connected by means of its inlet 14 to a pressurised paint material supply 25. This is a high-pressure hose which is fed to a ring main (not shown) and in which a paint material of a blue colour shade is situated under a pressure of, for example, 6 bar. The first valve means 12 is hermetically connected by means of its outlet 16 to one end of a hollow cylindrical intermediate piece 24 which is hermetically connected by means of its other end to the inlet 20 of the second valve means 18. The outlet 22 thereof is hermetically connected to a manifold channel 26 which can be pressurised. A paint material switching path is therefore substantially formed by the two valve means 12, 18 and the tube-like intermediate piece 24 which is arranged between them and which can be designed, for example, in the form of a piece of hose.

Furthermore, a pulsed air supply line 38 and a solvent supply line 42, which can be switched by further valve means 40, 44 respectively, open out into the manifold channel 26. In an exemplary embodiment, these supply lines can be used for cleaning the manifold channel 26 in the event of a colour change and therefore open out into the manifold channel at the end thereof. Furthermore, it can be assumed that further identically constructed paint material switching paths, which likewise open out into the manifold channel 26 and are intended for paint materials of other colour shades, are provided but not shown in this diagram. The output of the manifold channel 26 has a fluidic connection to an atomiser 48 for paint material, by means of which any paint material flowing in via an open paint material switching path and flowing out again at the output of the manifold channel 26 is atomised. The connection between atomiser 48 and manifold channel 26 can be switched by means of a further valve means 46.

The manifold channel 26 can in each case be pressurised depending on the switching state of the valve means. It is pressurised when one of the paint material paths is open and the pressure on the ring main side is then also transmitted to the manifold channel 26. The further valve means 40, 44 for the purging process are closed except for the purging process. An increased pressure also prevails in the manifold channel 26 when the third valve means 46 is open, that is to say when paint material flows from the manifold channel 26 to the atomiser 48. A complete relief of the pressure in the manifold channel 26 can therefore substantially be achieved when none of the switching paths which open out into the manifold channel are fully open and the third valve means 46 is open.

An evaluation device 30 is connected by means of appropriate control cables 32, 34 to the first valve means 12 and to the second valve means 18. This includes both an activation of the valve means 12, 18 by the evaluation device 30 and also a feedback of the respective switching state of the valve means 12, 18. Furthermore, means for monitoring the intermediate piece 24, which is designed in the form of a piece of hose, are a commercially available pressure sensor. This is designed to transmit continuous measurements relating to the pressure prevailing in the piece of hose via a communications cable 36 to the evaluation device 30. The evaluation device 30 is also designed for activating the further valve means 40, 44, 46. In an exemplary embodiment, the evaluation device 30 is part of a robot controller which is provided anyway and which therefore not only controls the movements of the associated robot but also its paint supply.

Figure 2:
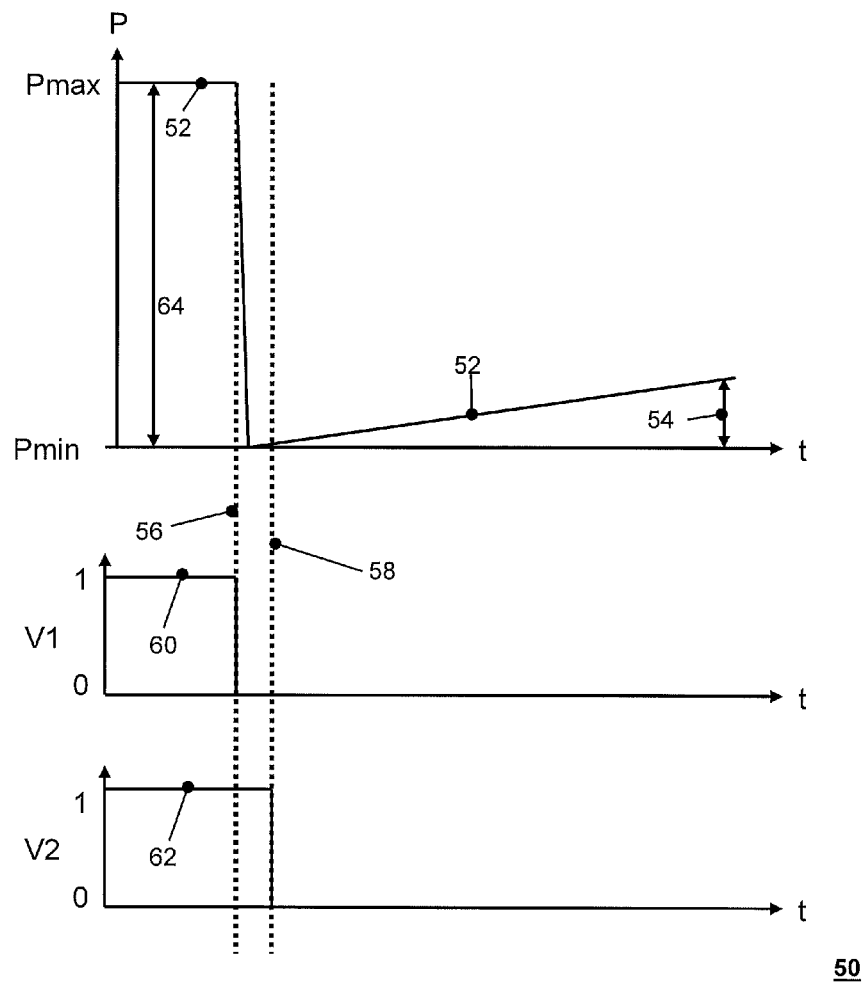
FIG. 2 shows a schematic sequence diagram in accordance with an exemplary embodiment of the present disclosure.
Figure 3:
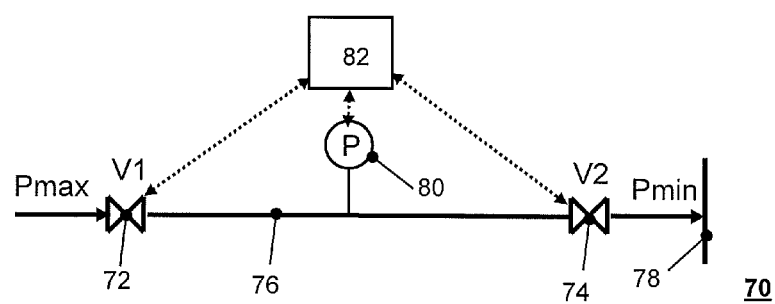
FIG. 3 shows a second paint material switching path in accordance with an exemplary embodiment of the present disclosure.

FIG. 2 shows a schematic sequence diagram in accordance with an exemplary embodiment of the present disclosure. FIG. 2 illustrates a schematic sequence diagram 50 for the process of detecting a leak in a valve means of a paint material switching path such as is also shown in FIG. 3.

An exemplary pressure characteristic 52 with respect to time in the tube-like intermediate piece is shown in the top diagram. The middle diagram shows the characteristic 60 with respect to time of the switching state of an associated first valve means which is connected to a paint supply line, and the bottom diagram the characteristic 62 with respect to time of the switching state of an associated second valve means which opens out into a manifold channel which is assumed to be open.

At the beginning of the time characteristic, the first valve means V1 and the second valve means V2 are open so that a pressure Pmax, which also prevails in the associated paint supply line, is produced in the tube-like intermediate piece. At a later time—indicated by the left-hand vertical dashed line 56—the valve means V1 on the supply line side is closed. As no new paint material is now able to flow, the pressure in the hollow cylindrical intermediate piece is relieved via the still open valve means V2 on the manifold channel side until it reaches the lower ambient pressure Pmin. A pressure difference Pmax–Pmin, as indicated by the arrow 64, therefore prevails between inlet and outlet of the first valve means V1. Subsequently, at a time indicated by the dashed line 58, the valve means V2 on the manifold channel side is now also closed so that the tube-like intermediate piece is hermetically sealed on both sides.

In the further course of events, due to a leak in the valve means V2 and the pressure difference Pmax–Pmin which is present across said valve means, paint material now seeps through the leaking valve V2 into the tube-like intermediate piece. In the further course of time, this leads to an increase in its internal pressure which becomes noticeable due to the occurrence of a drift 54. This is then the criterion on the basis of which, according to an exemplary embodiment, a leak in the first valve means V1 can be inferred.

FIG. 3 shows a second paint material switching path in accordance with an exemplary embodiment of the present disclosure. As shown in FIG. 3, a first valve means 72 is connected to a paint material supply line which is at a pressure Pmax. A hollow cylindrical intermediate piece 76 is arranged between the first valve means 72 and a second valve means 74. The outlet side of the second valve means 74 is connected to a manifold channel 78 which is currently depressurised and connected to an external pressure Pmin. An evaluation device 82 is provided to communicate with the two valve means 72, 74 in that their switching states can be specified and also interrogated. A pressure sensor 80 is provided for monitoring the hollow cylindrical intermediate piece 76, which is designed in the form of a piece of hose, and connected to the evaluation device 82 by means of a data cable.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCES

10 Exemplary paint material switching path with paint supply system
12 First valve means
14 Inlet of first valve means
16 Outlet of first valve means
18 Second valve means
20 Inlet of second valve means
22 Outlet of second valve means
24 Hollow cylindrical intermediate piece
25 Pressurised paint material supply
26 Pressurisable manifold channel
28 Means for measuring the hose pressure
30 Evaluation device
32 First control cable
34 Second control cable
36 Communications cable
38 Pulsed air supply line
40 First further valve means
42 Solvent supply line
44 Second further valve means
46 Third further valve means
48 Atomiser for paint material
50 Schematic sequence diagram
52 Pressure characteristic with respect to time
54 Drift
56 Switching time of first valve
58 Switching time of second valve
60 Characteristic with respect to time of the switching state of the first valve means
62 Characteristic with respect to time of the switching state of the second valve means 64 Pressure difference
70 Exemplary paint material switching path
72 First valve means
74 Second valve means
76 Hollow cylindrical intermediate piece
78 Pressurisable manifold channel
80 Means for measuring the hose pressure
82 Evaluation device

What is claimed is:

1. A paint material switching path, comprising:
   first and second valve means each valve means having an inlet and an outlet;
   a hollow cylindrical intermediate piece arranged between the outlet of the first valve means and the inlet of the second valve means, wherein the inlet of the first valve means is configured to be connected to a continuously pressurized paint material supply;
   a manifold channel which is configured to be pressurized and into which the outlet of the second valve means opens;
   means for measuring pressure in the hollow cylindrical intermediate piece; and
   an evaluation device that detects leaks in at least one of the two valve means based on the measured pressure with respect to time for a given pressure difference between the inlet of the first valve means and outlet of the second valve means when leak detection begins,
   wherein both valves means are closed during a leak detection.

2. The paint material switching path according to claim 1, wherein the valve means can be switched by the evaluation device.

3. The paint material switching path according to claim 1, wherein further valve means are provided, by means of which the manifold channel is configured be pressurized and which is configured to be switched by the evaluation device.

4. A colour changer comprising:
   a plurality of paint material switching paths, wherein each switching path comprises:
   first and second valve means each valve means having an inlet and an outlet,
   a hollow cylindrical intermediate piece arranged between the outlet of the first valve means and the inlet of the second valve means, wherein the inlet of the first valve means is configured to be connected to a continuously pressurized paint material supply;
   a manifold channel which is configured to be pressurized and into which the outlet of the second valve means opens;
   means for measuring pressure in the hollow cylindrical intermediate piece; and
   an evaluation device that detects leaks in at least one of the two valve means based on the measured pressure with respect to time for a given pressure difference between the inlet of the first valve means and outlet of the second valve means when leak detection begins,
   wherein, each path opens out into a common manifold channel,
   wherein further valve means are provided, by means of which the manifold channel is configured to be pressurized and switched by the evaluation device.

5. The colour changer according to claim 4, wherein a common evaluation device is provided for detecting leaks.

6. The colour changer according to claim 4, wherein both valves means of the paint material switching path are configured to be closed during a leak detection.

7. The colour changer according to claim 4, wherein the valve means of the paint material switching path are configured to be switched by the evaluation device.

8. The colour changer according to claim 4, wherein the common manifold channel is configured to be connected to an atomizer for paint material.

9. The colour changer according to claim 4, wherein means are provided for purging the switching path with a solvent.

10. A method for detecting a leak in a valve means of a paint material switching path including first and second valve means, each valve means having an inlet and an outlet, a hollow cylindrical intermediate piece arranged between the outlet of the first valve means and the inlet of the second valve means, wherein the inlet of the first valve means is configured to be connected to a continuously pressurized paint material supply; a manifold channel which is configured to be pressurized and into which the outlet of the second valve means opens; means for measuring pressure in the hollow cylindrical intermediate piece; and an evaluation device that detects leaks in at least one of the two valve means based on the measured pressure with respect to time for a given pressure difference between the inlet of the first valve means and outlet of the second valve means when leak detection begins, the method comprising:
   closing the first valve means to be checked;
   producing a pressure difference between inlet and outlet of the first closed valve means to be checked when the second valve means is open;
   closing the second valve means;
   determining a pressure characteristic with respect to time in a sealed hose path; and
   determining whether the first valve means to be checked is faulty based on the pressure characteristic,
   wherein a procedure for checking the second valve means is similar to that of the first valve means.

11. The method for detecting a leak according to claim 10, wherein the first valve means is determined to be faulty if the pressure characteristic drifts.

* * * * *